US012700579B2

(12) United States Patent
Arnold

(10) Patent No.: US 12,700,579 B2
(45) **Date of Patent: *Aug. 4, 2026**

(54) OPEN PORT PROBE INTERFACES

(71) Applicant: DH Technologies Development Pte. Ltd., Singapore (SG)

(72) Inventor: Don W. Arnold, Concord (CA)

(73) Assignee: DH Technologies Development Pte. Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 18/333,535

(22) Filed: Jun. 12, 2023

(65) Prior Publication Data

US 2025/0149321 A1 May 8, 2025

Related U.S. Application Data

(63) Continuation of application No. 17/260,734, filed as application No. PCT/IB2019/056124 on Jul. 17, 2019, now Pat. No. 11,676,806.

(60) Provisional application No. 62/699,527, filed on Jul. 17, 2018.

(51) Int. Cl.
*H01J 49/04* (2006.01)

(52) U.S. Cl.
CPC ...... *H01J 49/0409* (2013.01); *H01J 49/0459* (2013.01)

(58) Field of Classification Search
CPC .... H01J 49/0409; H01J 49/0459; H01J 49/04; H01J 49/0431
See application file for complete search history.

(56) References Cited

U.S. PATENT DOCUMENTS 9,153,425 B2 10/2015 Van Berkel
9,632,066 B2 * 4/2017 Van Berkel .............. G01N 1/20
(Continued)

FOREIGN PATENT DOCUMENTS

WO WO-2017193213 A1 * 11/2017 .......... H01J 49/0459
WO 2018069872 A1 4/2018

OTHER PUBLICATIONS

Rane et al., "A Serial Sample Loading System: Interfacing Multiwell Plates With Microfluidic Devices", Journal of Laboratory Automation, Oct. 1, 2012, vol. 17, issue 5, p. 370-377 (Year: 2012).*
(Continued)

*Primary Examiner* — David E Smith

(57) ABSTRACT

Integrated system for delivering sample to a mass spectrometer, which includes a chamber extending from a top to bottom end, an open port probe disposed in the chamber such that an open end of the probe, which is configured for receiving a sample, is positioned in proximity to top end of the chamber. The system can further include a solvent inlet port coupled to said chamber for receiving a solvent and directing said solvent to said probe, and a solvent outlet port for receiving a flow of the solvent from the open port probe and directing the received solvent out of the chamber. The system can also include an adapter for receiving a sample holder having an outlet port, the adapter is releasable and replaceable and couple with chamber to align the outlet port of sample holder with open end of probe for delivering sample to the probe.

19 Claims, 12 Drawing Sheets

(56) References Cited

U.S. PATENT DOCUMENTS

| | | | | |
|---|---|---|---|---|
| 11,676,806 | B2 * | 6/2023 | Arnold ................ | H01J 49/0459 250/288 |
| 2004/0108293 | A1 | 6/2004 | Brockwell | |
| 2010/0019140 | A1 * | 1/2010 | Amirav ................. | H01J 49/049 250/288 |
| 2016/0299041 | A1 | 10/2016 | Kertesz et al. | |
| 2016/0299109 | A1 | 10/2016 | Van Berkel | |
| 2017/0316926 | A1 | 11/2017 | Arnold et al. | |

OTHER PUBLICATIONS

International Search Report and Written Opinion for International PCT Application No. PCT/IB2019/056124 mailed Dec. 18, 2019.

Rane et al., " A Serial Sample Loading System: Interfacing Muliwell Plates with Microfluidic Devices" Journal of Laboratory Automation, Oct. 1, 2012, vol. 17. Issue 5, pp. 370-377.

Supplementary Search Report for European Patent Application No. 19838344 mailed on Mar. 17, 2022.

Tascon et al., "Development of a Microfluidic Open Interface with Flow Isolated Desorption vol. for the Direct Coupling of SPME Devices to Mass Spectrometry", Analytical Chemistry, vol. 90, No. 4, Feb. 1, 2018, pp. 2631-2638 (Abstract).

* cited by examiner

OPEN PORT PROBE INTERFACES

RELATED US APPLICATIONS

This application is a continuation application of U.S. application Ser. No. 17/260,734 (since issued as U.S. Pat. No. 11,676,806), entitled "Open port probe interfaces." and filed Jan. 15, 2021. which is a national stage entry under 35 U.S.C. 371 of international application No. PCT/IB2019/056124, filed on Jul. 17, 2019, which in turn claims the benefit of priority from U.S. Provisional Application No. 62/699,527, filed on Jul. 17, 2018, the entire contents of which are incorporated by reference herein.

FIELD

The present invention relates generally to a device and system for rapid and consistent delivery of a sample to an open port probe, which can in turn deliver the extracted sample to a downstream mass spectrometer for mass analysis.

BACKGROUND

Mass spectrometry (MS) is an analytical technique for determining the elemental composition of test substances with both qualitative and quantitative applications. MS can be useful for identifying unknown compounds, determining the isotopic composition of elements in a molecule, determining the structure of a particular compound by observing its fragmentation, and quantifying the amount of a particular compound in a sample. Given its sensitivity and selectivity, MS is particularly important in life science applications.

In the analysis of complex sample matrices (e.g., biological, environmental, and food samples), many current MS techniques require extensive pre-treatment steps to be performed on the sample prior to MS detection/analysis of the analyte of interest. Such pre-analytical steps can include sampling (i.e., sample collection) and sample preparation (separation from the matrix, concentration, fractionation and, if necessary, derivatization). It has been estimated, for example, that more than 80% of the time of overall analytical processes can be spent on sample collection and preparation in order to enable the analyte's detection via MS or to remove potential sources of interference contained within the sample matrix, while nonetheless increasing potential sources of dilution and/or error at each sample preparation stage.

Ideally, sample preparation and sample introduction techniques for MS should be fast, reliable, reproducible, inexpensive, and in some aspects, amenable to automation. By way of example, various ionization methods have been developed that can desorb/ionize analytes from condensed-phase samples with minimal sample handling (e.g., desorption electrospray ionization (DESI) and direct analysis in real time (DART), which "wipe-off" analytes from the samples by exposing their surfaces to an ionizing medium such as a gas or an aerosol). However, such techniques can also require sophisticated and costly equipment, and may be amenable only for a limited class of highly-volatile small molecules. Another recent example of an improved sample introduction technique is an "open port" sampling interface in which relatively unprocessed samples can be introduced into a continuous flowing solvent that is delivered to an ion source of an MS system, as described for example in an article entitled "An open port sampling interface for liquid introduction atmospheric pressure ionization mass spectrometry" of Van Berkel et al., published in *Rapid Communications in Mass Spectrometry,* 29(19), pp. 1749-1756 (2015), which is incorporated by reference in its entirety.

An open port probe (OPP) sampling liquid-air interface can allow a rapid sample introduction for infusion-based mass analysis. However, the small open end of the sampling interface can make the reproducible loading of samples within the OPP probe challenging. While automation may be used for processing a large number of samples, for routine lower-volume sample processing, there is a need for improved introduction of a sample to the liquid-air interface of an OPP. There remains a need for improved sample introduction techniques that provide sensitivity, simplicity, selectivity, speed, reproducibility, and high-throughput.

SUMMARY

The present teachings are generally directed to devices and systems that allow for efficient delivery of a sample from a sample holder containing a sample for analysis to an open port probe (OPP) coupled to a mass spectrometer system. In accordance with various aspects, a device containing an OPP is provided that can be releasably and replaceably coupled to a variety of adapters, each configured to facilitate aligning of an outlet port of a sample holder (e.g., a capillary, a melting point tube, a pipette, a dried blood spot card, SPME fiber or blade) to the open end of the OPP such that the analytes contained within the sample holder can be delivered to the fluid within the OPP. In various aspects, each adapter can include one or more sample alignment features that can be tailored or optimized to a particular type of sample holder to facilitate the reproducible introduction of a sample from the sample to the same location of the sampling interface of the OPP. Together, the device and the adapter can collectively form an integrated sample delivery system that can be used for rapid sample introduction for infusion-based mass spectrometric analysis that can allow analytes adsorbed onto solid surfaces (e.g., SPME substrates, dried blood spots) and fluids (e.g., injected from a pipette, flowing capillaries) to be guided into an optimum position for sampling by the OPP, thereby allowing improved loading of the OPP.

In one aspect, a device for introducing a sample to a mass spectrometer is disclosed, which comprises a chamber extending from a top end to a bottom end, a sampling probe configured to be disposed in said chamber such that a sampling space at an open end of the sampling probe providing a liquid-air interface for receiving one or more sample analytes is positioned at or in proximity of said top end of the chamber, said sampling probe having an outlet port configured for being in fluid communication with an ionization source. The device can further include a solvent inlet port coupled to said chamber for receiving a solvent and directing said solvent to said sampling space of the sampling probe, and a solvent outlet port for receiving a flow of the solvent from the sampling space sampling probe and directing the received solvent out of the chamber. The chamber is also configured for releasable and replaceable coupling (e.g., at its top end) to an adapter that is configured to align an outlet port of a sample holder with said open end of the probe for introduction of a sample to the probe. In some embodiments, the top end of the chamber can include a mounting surface for engaging with a respective mounting surface of the adapter, thereby coupling the adapter to the chamber.

In some embodiments, the chamber can include a ridge, e.g., a substantially circular ridge, at the top end thereof, where an external surface of said ridge corresponds to said mounting surface of the chamber.

In some embodiments, the device can include a fixation element for securing said open port probe to said chamber.

In some embodiments, the sample holder can include any of a pipette, a capillary tube, a melting point tube, a dried blood spot (DBS) card, and a vial cap.

In some embodiments, the adapter can include a top surface and a sidewall extending downwardly from the top surface, where the sidewall includes an inner surface configured for engaging with an external surface portion of the chamber for coupling the adapter to the chamber.

In some embodiments, the adapter can include a channel having an opening at a top surface of the adapter, where the channel is configured for receiving at least a portion of the open port probe including an open end thereof upon coupling of the adapter to the chamber.

In some embodiments, the adapter can include an alignment element for receiving at least partially a sample holder containing a sample so as to align an outlet port of the sample holder with the open end of the open port probe for introduction of the sample to the probe. By way of example, the alignment element can be configured to receive any of a capillary tube, a melting point tube, a pipette and a dried blood spot card. In some embodiments, the alignment element can include a slot formed on the top surface of the adapter. In some embodiments, the alignment element comprises an inverted, truncated conical surface protruding above said top surface of the adapter and tapering down to said channel opening.

In some embodiments, the chamber of the above device can comprise an upper cylindrical portion and a lower cylindrical portion, each of said portions having a sidewall. In some embodiments, the upper cylindrical portion has a larger diameter than the lower cylindrical portion. The external surface of the sidewall of the top cylindrical portion can provide a mounting surface for engaging with the respective mounting surface of the adapter for coupling the adapter to the chamber. In some such embodiments, a partition can separate the upper cylindrical portion from the lower cylindrical portion. The partition can include an opening through which the open port probe can extend such that the open end of the probe is positioned in said upper chamber. In some embodiments, a fixation member in the form of a disk having an opening and supported by said partition can be used for securing the open port probe to the chamber. For example, the fixation disk can include an opening in register with the partition opening through which the open port probe extends, thereby maintain said open port probe in a desired orientation.

In a related aspect, an integrated system for delivering a sample to a mass spectrometer is disclosed, which includes a chamber extending from a top end to a bottom end, an open port probe disposed in the chamber such that an open end of the probe, which is configured for receiving a sample, is positioned in proximity of said top end of the chamber. The system can further include a solvent inlet port coupled to said chamber for receiving a solvent and directing said solvent to said open port probe, and a solvent outlet port for receiving a flow of the solvent from the open port probe and directing the received solvent out of the chamber. The system can also include an adapter for receiving a sample holder having an outlet port, where the adapter is configured for releasable and replaceable coupling with the chamber so as to align the outlet port of the sample holder with the open end of the probe for delivering the sample to the probe.

In some embodiments of the above system, the chamber comprises a mounting surface at or in proximity of the top end thereof and the adapter comprises a respective mounting surface for releasable and replaceable engagement with the mounting surface of said chamber.

In some embodiments, the chamber includes a lower chamber and an upper chamber, and a partition separating the upper and the lower chambers, said partition having an opening so as to allow said open port probe to extend from the upper chamber to the lower chamber such that the open end of the probe is positioned in said upper chamber, where said upper chamber comprises a sidewall having an external surface providing said mounting surface of the chamber.

In some embodiments, the adapter includes an upper surface, and a sidewall extending from said upper surface, where an inner surface of said sidewall corresponds to said respective mounting surface of the adapter.

In another aspect, a mass spectroscopy system is disclosed, which includes a sample delivery system, an ionization source coupled to an outlet port of the sample delivery system for receiving a sample therefrom, and a mass analyzer positioned downstream of the ionization source for receiving ions generated by the ionization source and performing a mass analysis of those ions.

In some embodiments, a kit for use with a mass spectrometer is described, the kit comprising: a sampling probe that comprises: an open end that is configured to provide a liquid-air interface at a sampling space, an outlet port that is configured to be fluidly connected to an ionization source, a probe aligning apparatus and two or more adapters, each of the two of more adapters being configured to interface with two or more different sample holders. The probe aligning apparatus comprising: a chamber extending from a top end to a bottom end, the chamber being configured to receive the sampling probe such that the open end of the sampling probe is positioned at or in proximity of the top end when the sampling probe is inserted into the chamber, an inlet port that is coupled to the chamber that is configured to receive a solvent and is fluidly connected to direct the solvent to the sampling space of the sampling probe, a solvent outlet port that is configured to receive a flow of solvent from the sampling space and is configured to direct solvent from the sampling space to outside of the chamber. The chamber is configured to releasably and replaceably couple at its top end, each of the two or more adapters separately, each of the two or more adapters being configured to align an outlet port of a different sample holder of the two or more different sample holders, with the sampling space of the sampling probe when the sampling probe is disposed in the chamber.

Further understanding of various aspects of the present teachings can be obtained by reference to the following detailed description in conjunction with the associated drawings, which are described briefly below.

DETAILED DESCRIPTION

The present teachings are generally directed to devices and systems that allow for efficient delivery of a sample from a sample holder to an open port probe (OPP). In some embodiments, a device containing an OPP is provided that can be releasably and replaceably coupled to a variety of adapters, each configured to facilitate aligning of an outlet port of a sample holder, such as a capillary, melting point tube, a pipette, or a dried blood spot card, to the open end of the OPP. In some embodiments, the adapter can be in the form of a cap that can be releasably and replaceably coupled to the sample delivery device having an OPP. The adapter can include one or more sample alignment elements (features), which can be tailored for a variety of different types of sample introduction to the OPP. Such alignment features can advantageously facilitate the reproducible introduction of a sample to the same location of the open interface of the OPP. The outlet of the OPP can be fluidly coupled to an ion source of a mass spectrometer for delivery of a sample to the ion source. The device and the adapter can collectively form an integrated sample delivery system that can be used for rapid sample introduction for infusion-based mass spectroscopic analysis. For example, the device and the adapter can allow solid surfaces, fluids and flowing capillaries to be guided into position relative to the OPP, thereby allowing improved manual loading of the OPP.

Figure 1A:
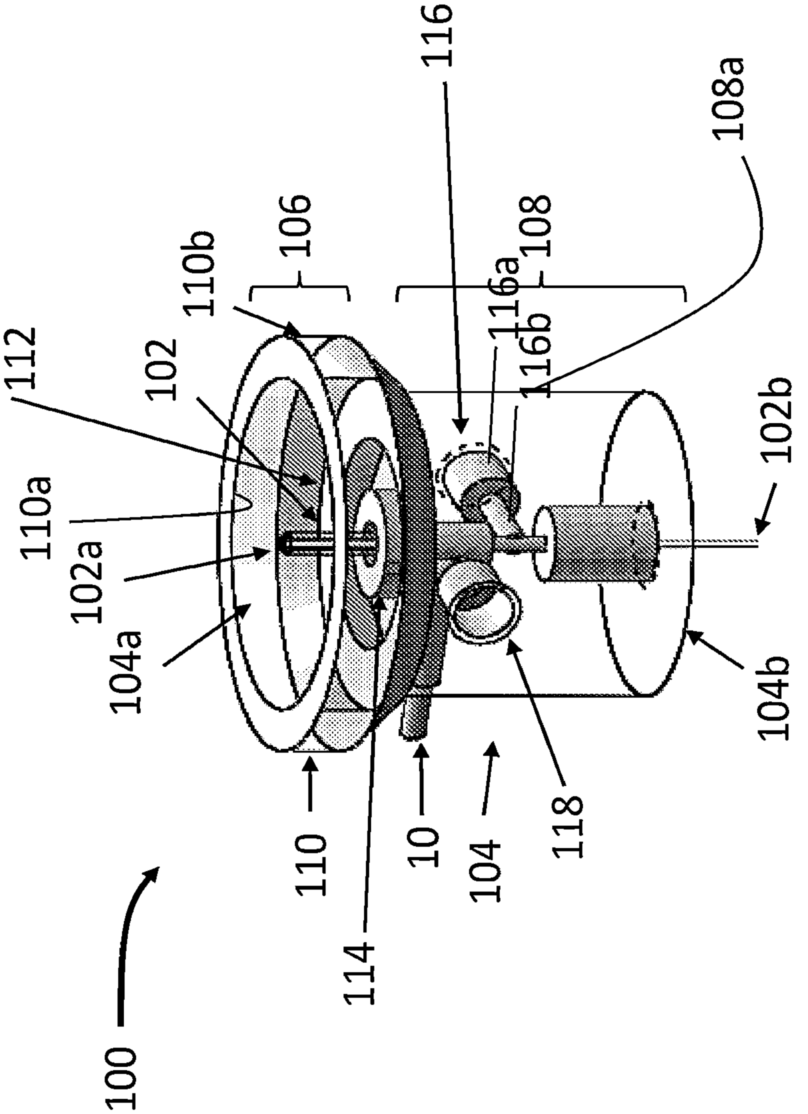
FIG. 1A schematically depicts a sample delivery device in accordance with an embodiment of the present teachings having an open port probe for delivering a sample to a mass spectrometer.

FIG. 1A schematically depicts a device 100 for delivery of a sample to a mass spectrometer. The device 100 includes an open port probe (OPP) 102 that is disposed/inserted in a chamber 104 (herein also referred to as a fluidic chamber, which operates as a probe alignment apparatus), which extends from a top opening 104*a* to a bottom opening 104*b*. In this embodiment, the chamber 104 includes an upper portion 106 and a lower portion 108. The upper and the lower portions are substantially cylindrical, though other shapes can also be employed. The upper portion 106 of the chamber 104 includes a sidewall 110 having an inner surface 110*a* and an outer surface 110*b*. As discussed in more detail below, the outer surface 110*b* provides a mounting surface for releasably and replaceably coupling the chamber to an adapter configured to receive a sample holder. In this embodiment, the upper portion 106 is in the form of a circular ridge.

The lower portion 108 of the chamber 104 has a cylindrical sidewall 108*a*. A tapered transition segment 112 joins the upper portion 106 of the chamber 104 to its lower portion 108. In this embodiment, the upper portion, the tapered transition segment and the lower portion of the chamber 104 are formed as one integral unit, though in other embodiments they can be made separately and joined to one another.

Figure 1B:
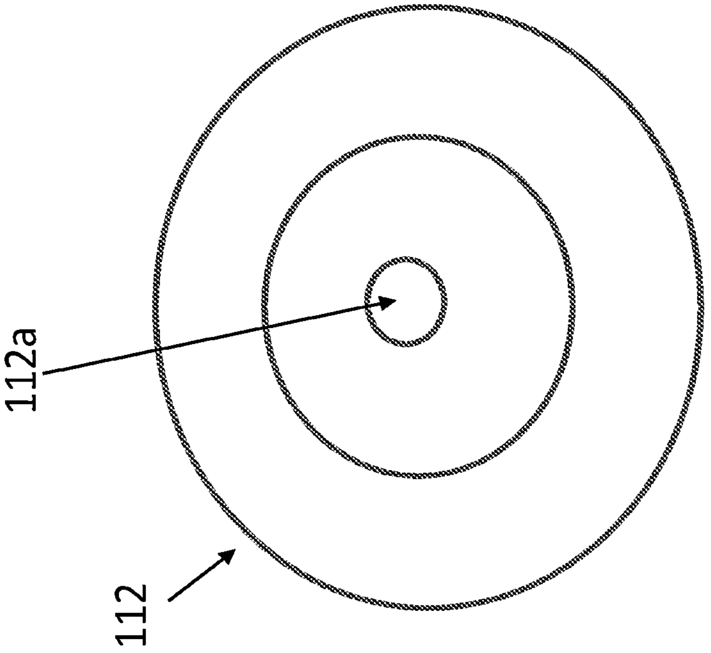
FIG. 1B is a schematic top view of a partition disposed in the delivery device of FIG. 1A to separate a top chamber from a bottom chamber of the device, FIG. 2 schematically depicts an exemplary implementation of an open port probe suitable for use in the device of FIG. 1A, FIG. 3A schematically depicts an integrated sample delivery system according to an embodiment of the present teachings, which includes an adapter configured for receiving a sample holder coupled to the sample delivery device depicted in FIG. 1A.

The OPP 102 extends from an open end 102*a*, which is configured to receive a sample, to an outlet port 102*b* through which the sample can exit the probe, e.g., to reach a downstream ionization source of a mass spectrometer. The OPP 102 is positioned within the chamber 104 such that a top portion thereof is within the upper portion 106 and the lower portion thereof is within the lower portion 108 of the chamber 104. More specifically, in this embodiment, the OPP 102 passes through an opening 112*a* (See, FIG. 1B) of a partition 112 disposed between the upper portions 106 and 108 of the chamber 104 to extend between these two portions of the chamber. A disk-shaped element 114, which is supported by the floor of the partition 112, surrounds a portion of the OPP 102 to facilitate maintaining the OPP 102 is a stable orientation within the chamber 104.

In this embodiment, the OPP 102 is positioned substantially vertically within the chamber 104 such its open end 102*a* is at, or in close proximity of, the top opening 104*a* of the chamber 104. In other embodiments, the open end 102*a* of the probe can protrude above the upper portion 106 of the chamber 104.

With continued reference to FIG. 1A, the device 100 further includes a solvent inlet port 116 that includes a connector 116*a* that protrudes through the sidewall 108*a* of the lower portion of the chamber outside the chamber for coupling to a source of solvent and a pipe 116*b* that extends from the connector 116*a* to the OPP 102. The solvent inlet port can provide a flow of a solvent through the OPP 102. The device 100 further includes a solvent overflow outlet 118 that is coupled to the chamber and protrudes through the sidewall 108*a* of the lower portion of the chamber through which solvent overflow can be removed from the OPP 102.

The OPP 102 can have a variety of configurations but generally includes an open end, such as the open end 102*a*, by which a liquid delivered from a sample holder is open to the atmosphere, thus exhibiting a liquid-air interface. The open end can further be configured to receive therethrough a sample containing or suspected of containing one or more analytes. By way of non-limiting example, the sample can comprise a liquid sample that can be introduced (e.g., injected, pipetted, acoustically injected) directly into the liquid present within the sample space. It will likewise be appreciated by those skilled in the art in light of the teachings herein that any liquid (e.g., solvent) suitable for directly receiving a liquid sample, for example, and amenable to the ionization process can be provided in accordance with various aspects of the present teachings.

The device 100 further includes a ground wire 10 for electrically grounding the OPP 102.

Figure 2:
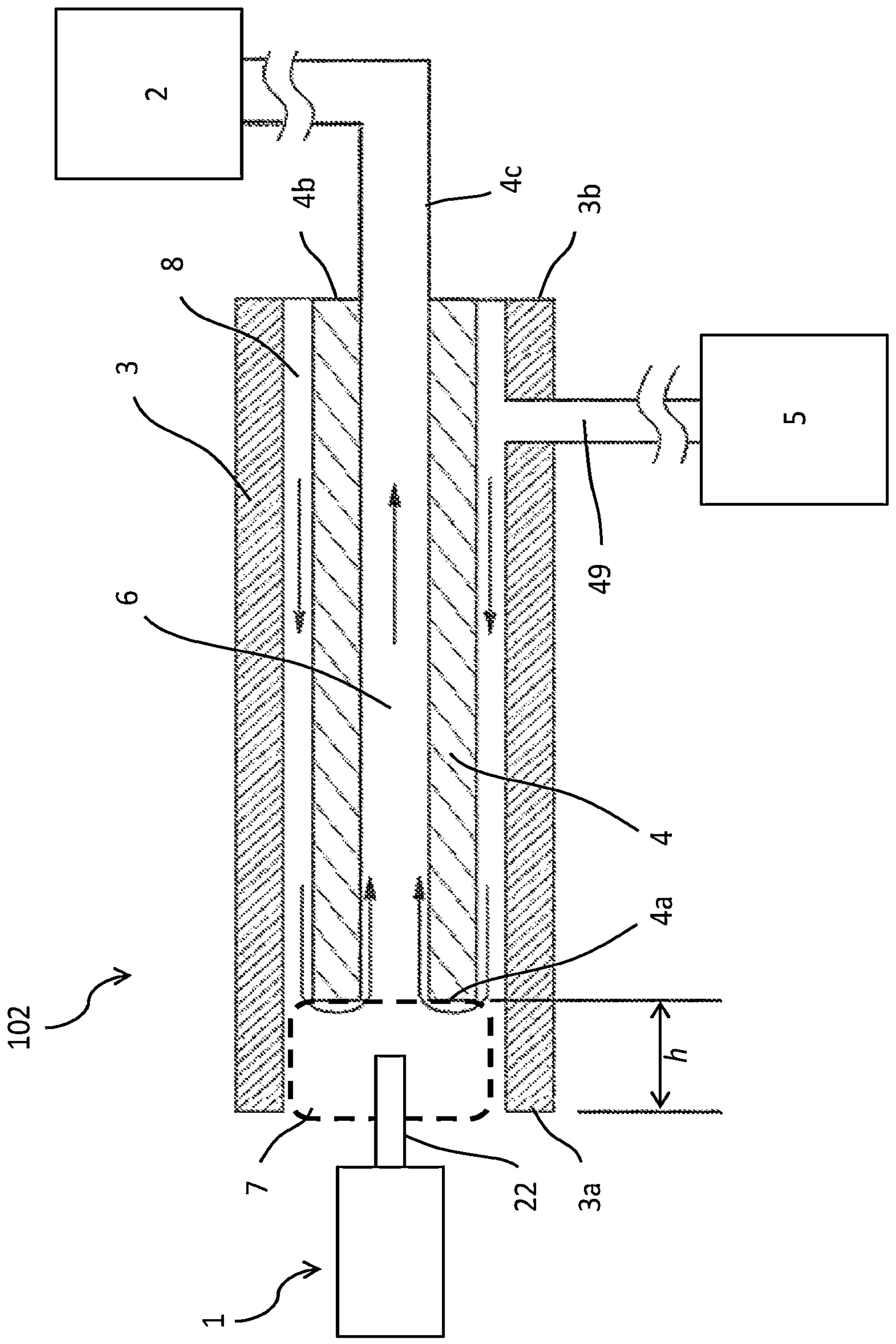

FIG. 2 schematically depicts an exemplary implementation of the OPP 102, which can provide a fluid pathway between a sample holder 1 and an ion source 2 such that analytes entrained within a liquid in the sample holder (e.g., desorption solvent) can be delivered to and ionized by the ion source 2. The OPP 102 can have a variety of configurations for receiving a liquid sample through its open end or sampling desorbed analytes from a substrate, but in the depicted exemplary configuration, it includes an outer tube (e.g., outer capillary tube 3) extending from a proximal end 3*a* to a distal end 3*b* and an inner tube (e.g., inner capillary tube 4) disposed co-axially within the outer capillary tube 3. As shown, the inner capillary tube 4 also extends from a proximal end 4*a* to a distal end 4*b*. The inner capillary tube 4 comprises an axial bore providing a fluid channel therethrough, which as shown in the exemplary embodiment of FIG. 2 defines a sampling conduit 6 through which liquid can be transmitted from the OPP 102 to the ion source 2 via the probe outlet conduit 4*c*. On the other hand, the annular space between the inner surface of the outer capillary tube 3 and the outer surface of the inner capillary tube 4 can define a solvent conduit 8 extending from an inlet end coupled to the solvent source 5 (e.g., via the probe inlet conduit 49) to an outlet end (adjacent the distal end 4*b* of the inner capillary tube 4). In some exemplary aspects of the present teachings, the proximal end 4*a* of the inner capillary tube 4 can be recessed relative to the proximal end 3*a* of the outer capillary tube 3 (e.g., by a distance h as shown in FIG. 2) so as to define a distal fluid chamber 7 that extends between and is defined by the proximal end 4*a* of the inner capillary 4 and the proximal end 3*a* of the outer capillary tube 3. Thus, the distal fluid chamber 7 represents the space adapted to contain fluid between the open proximal end of the probe 102 and the proximal end 4*a* of the inner capillary tube 4.

Further, as indicated by the arrows of FIG. 2 within the sampling probe 102, the solvent conduit 8 is in fluid communication with the sampling conduit 6 via this distal fluid chamber 7. In this manner, fluid that is delivered to the proximal fluid chamber 7 through the solvent conduit 8 can enter the inlet end of the sampling conduit 6 for subsequent transmission to the ion source 2. It should be appreciated that though the inner capillary tube 4 is described above and shown in FIG. 2 as defining the sampling conduit 6 and the annular space between the inner capillary tube 4 and the outer capillary tube 3 defines the solvent conduit 8, the conduit defined by the inner capillary tube 4 can instead be coupled to the solvent source 5 (so as to define the solvent conduit) and the annular space between the inner and outer capillaries 4, 3 can be coupled to the ion source 2 (so as to define the sampling conduit).

It will be appreciated that sampling probes in accordance with the present teachings can also have a variety of configuration and sizes, with the OPP 102 depicted in FIG. 2 representing an exemplary depiction. By way of non-limiting example, the dimensions of an inner diameter of the inner capillary tube 4 can be in a range from about 1 micron to about 1 mm (e.g., 200 microns), with exemplary dimensions of the outer diameter of the inner capillary tube 4 being in a range from about 100 microns to about 3 or 4 millimeters (e.g., 360 microns). Also by way of example, the dimensions of the inner diameter of the outer capillary tube 3 can be in a range from about 100 microns to about 3 or 4 millimeters (e.g., 450 microns), with the typical dimensions of the outer diameter of the outer capillary tube 3 being in a range from about 150 microns to about 3 or 4 millimeters (e.g., 950 microns). The cross-sectional shapes of the inner capillary tube 4 and/or the outer capillary tube 3 can be circular, elliptical, super-elliptical (i.e., shaped like a super-ellipse), or even polygonal (e.g., square).

Figure 3A:
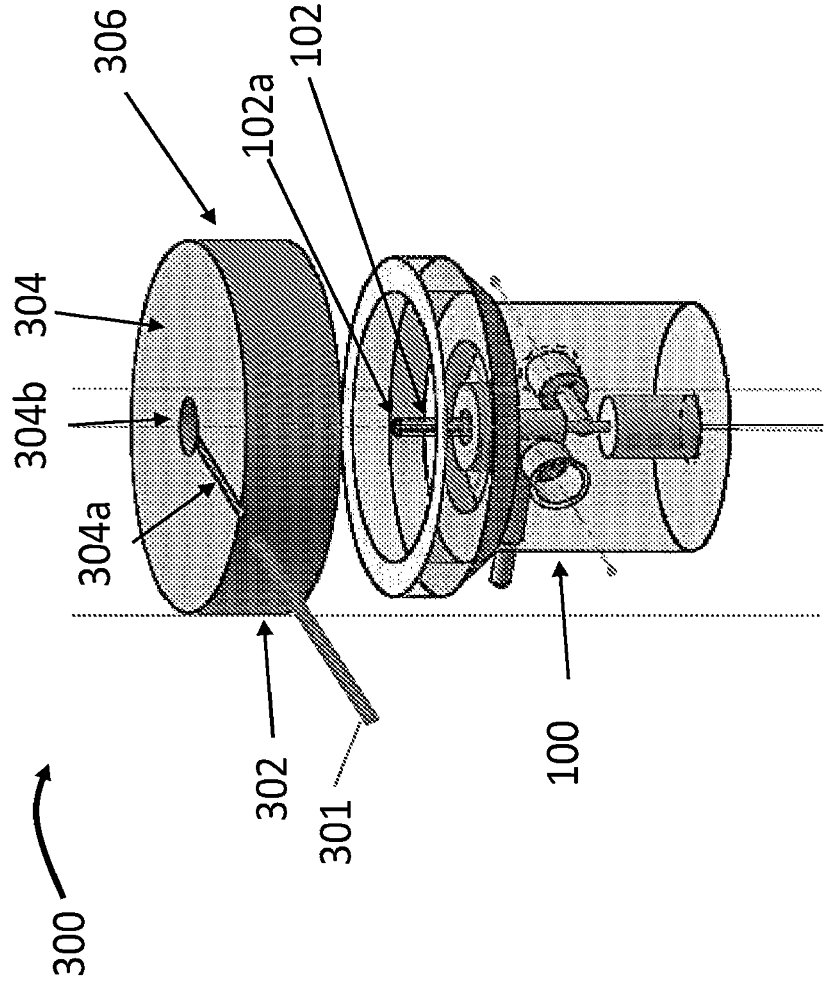
FIG. 3B is a schematic cross-sectional side view of an adapter employed in the system of FIG. 3A, FIG. 4 schematically depicts an integrated sample delivery system according to another embodiment of the present teachings, FIG. 5 schematically depicts an integrated sample delivery system according to yet another embodiment of the present teachings.
Figure 3B:
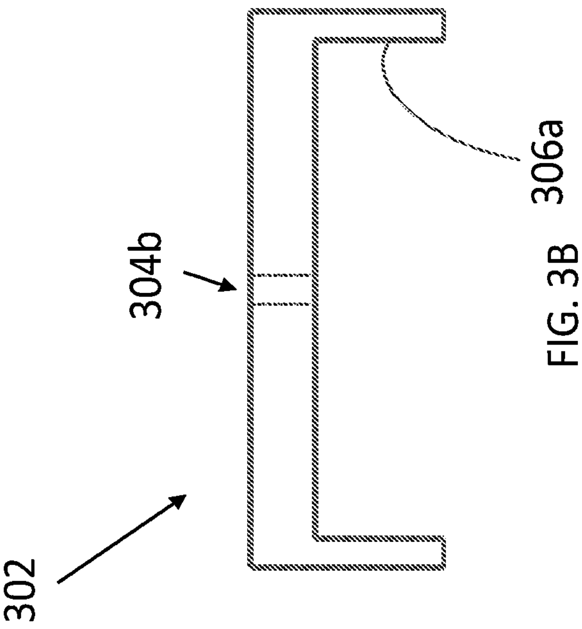

As noted above, the device 100 can be releasably and replaceably coupled to a variety of different adapters, which are configured for aligning a sample holder, e.g., the outlet end of a pipette, with the open end of the OPP 102 to allow facile and reproducible delivery of samples to the OPP 102. By way of example, FIG. 3A schematically depicts an integrated sample delivery system 300 according to an embodiment, which includes the device 100 described above, and an adapter 302 that can releasably and replaceably couple to the device 100 to align a sample holder with the open end 102*a* of the OPP 102. More specifically, with reference to FIG. 3A as well as FIG. 3B, in this embodiment, the adapter 302 includes a top surface 304, and a sidewall wall 306 extending downwardly from the top surface 304. The sidewall 306 includes an inner surface 306*a*, which can engage with the mounting surface 110*b* of the upper portion of the fluidic chamber 104 of the device 100 to releasably and replaceably couple the adapter 302 to the sample delivery device 100.

The adapter 302 includes a slot 304*a* formed in the top surface 304 of the adapter 302 for receiving a sample holder 301, e.g., a pipette in this embodiment. The adapter 302 further includes a central channel 304*b* that is configured for receiving a top portion of the OPP 102 upon coupling the adapter to the fluidic chamber 104 such that the open end of the OPP 102 is in proximity of, or in contact with, the outlet port of the sample holder positioned in the slot 304*a* such that the OPP 102 can receive, via its open end, a sample contained in the sample holder.

Figure 4:
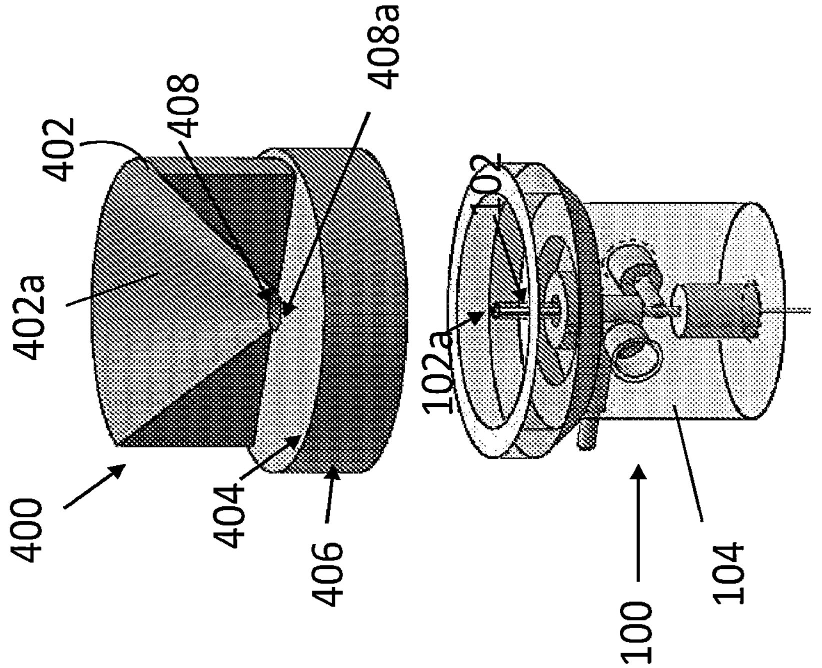

As noted above, the delivery device 100 having a OPP 102 can be coupled to a variety of different adapters, each configured for aligning one or more types of sample holders to the OPP 102. For example, FIG. 4 schematically depicts another adapter 400 that includes a pipettor alignment fixture 402 that allows a user to rest a pipette tip thereon and guide it to the open end of the OPP 102.

More specifically, similar to the adapter 302 discussed above, the adapter 400 includes a top surface 404 and a sidewall 406 that extends downwardly from the top surface 404, and can be used to engage the adaptor 400 with the top end of the fluidic chamber 104 of the sample delivery device 100. The adapter 400 further includes a channel 408 having a top opening 408*a*. Upon engagement of the adapter with the fluidic chamber 104, a top portion of the OPP 102 is received in the channel 408 such that the open end 102*a* of the OPP 102 is substantially flush with the opening 408*a*.

As noted above, the adapter 400 further includes the alignment fixture 402, which can be used to align a sample holder, e.g., a pipette, with the open end of the OPP 102. In this embodiment, the alignment fixture 402 is in the form of an inverted truncated conical surface that protrudes above the top surface 404 of the adapter 400 with its vertex positioned substantially at the opening 408*a*. In use, a pipette can be rested on the conical surface 402*a* of the alignment fixture and its outlet end (tip) can be guided to the open end 102*a* of the OPP 102 so as to deliver a sample contained in the pipette to the OPP 102.

Figure 5:
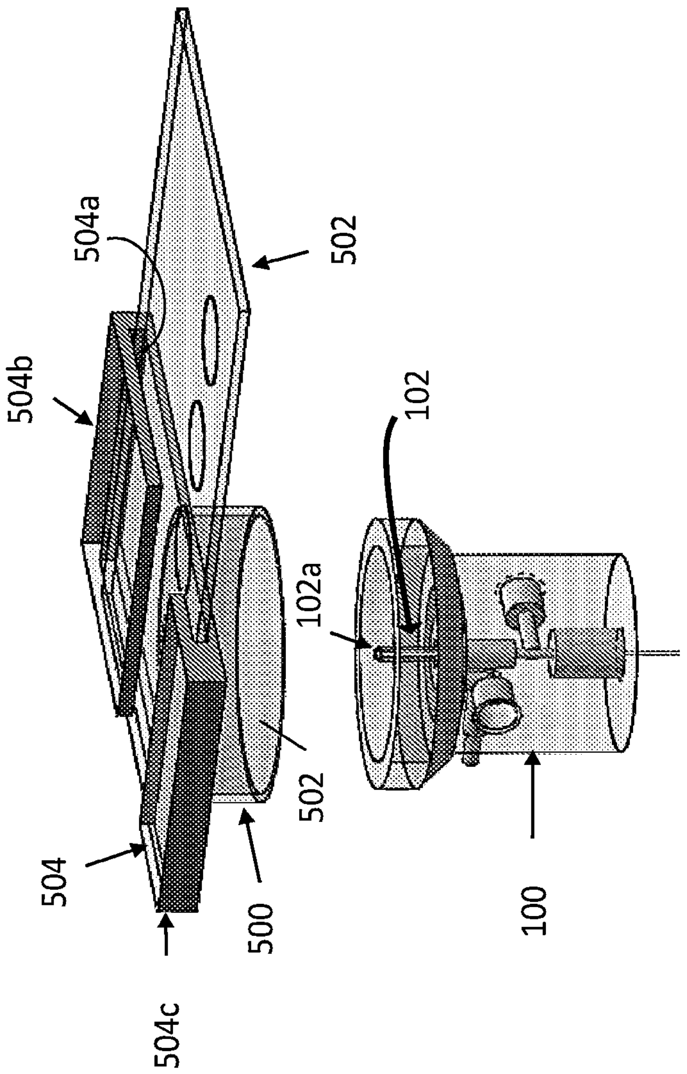

FIG. 5 schematically depicts an integrated sample delivery system according to another embodiment, which includes the device 100 discussed above and an adapter 500 according to another embodiment, which is configured for coupling to a Dried Blood Spot (DBS) card 502 so as to expose a desired spot to the open end 102*a* of the OPP 102 of the device 100. More specifically, the adapter 500 includes a sidewall 502 that extends downwardly from a top surface (not visible in this figure) in which a channel is formed, similar to the channels 304*b* and 408 in the previous embodiments, for receiving a top portion of the OPP 102 such that the open end of the OPP 102 is substantially flush with the top surface of the adapter. In this embodiment, the adapter 500 further includes a DBS card holder 504 for receiving, via an opening 504*a* thereof, the DBS card 502 and maintaining the card over the top surface of the adapter. More specifically, in this embodiment, the DBS holder 504 is in the form of a bracket having two wings 504*b* and 504*c* that facilitate maintaining the DBS card over the OPP 102.

In use, the DBS card 502 is inserted into the DBS holder 504 such that a spot is aligned with the open end of the OPP 102 for extraction of a sample from the spot. After sample extraction from a spot, the adapter can be lifted from the OPP, the card is moved to the next spot and the adapter is placed on the OPP for the next extraction.

The sample delivery device and the adapter can be formed of a variety of suitable materials. For example, in some embodiments, the adapter can be formed of a plastic, such as ABS (acrylonitrile butadiene styrene). In some aspects, the OPP can be formed of stainless steel, plastic, or glass, all by way of non-limiting example.

Figure 6:
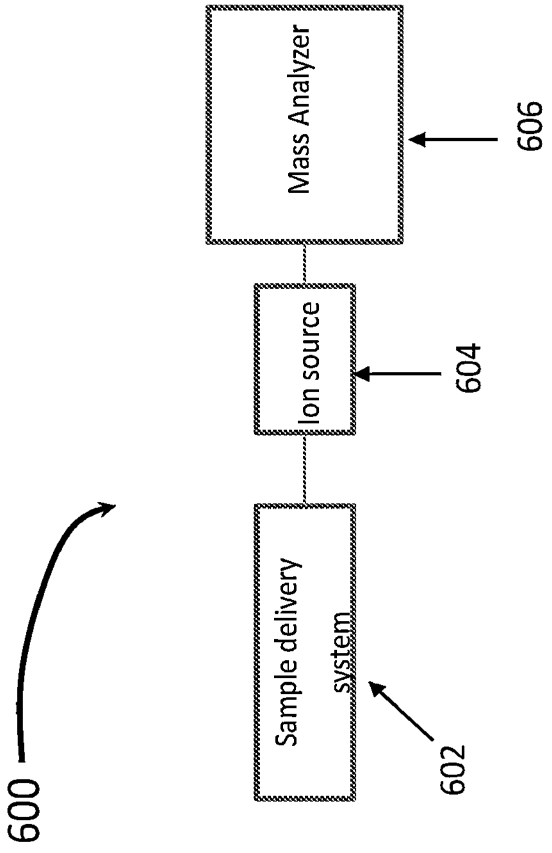
FIG. 6 is a schematic depiction of a mass spectrometer in which a sample delivery system according to the present teachings is incorporated.

As noted above, a sample delivery system according to the present teachings can be used to deliver a sample to a mass spectrometer. By way of illustration, FIG. 6 schematically shows a mass spectrometer 600, which includes a sample delivery system 602 according to the present teachings, an ionization source 604 and a mass analyzer 606 disposed downstream of the ionization source. In use, a sample can be introduced to the open end of an OPP of the delivery system 602, which can in turn deliver the sample to the ionization source 604. The ionization source can ionize one or more species in the sample, and the ionized species can be transmitted to the mass analyzer 606 for mass analysis. A variety of ionization sources and mass analyzers can be employed. By way of example, the ionization source can be an electrospray ionization source and the mass analyzer can be any of quadrupole or a time-of-flight mass analyzer.

In some embodiments, various parts of the device described previously may be combined to form a kit, the kit containing two or more interchangable adapters that releasably and replacebly interact and/or engage with the top end of the chamber so as to align an outlet port of a sample holder with the sampling space of the probe. In some embodiments there are at least two different sample holders and each of the at least two adapters is separately configured to align the sampling space of the probe with a different sample holder of the at least two different sample holders.

The following examples are provided by way of providing further elucidation of various aspects of the present teachings, and are not intended to be limiting of the scope of the present teachings.

EXAMPLES

Example 1

Figure 7A:
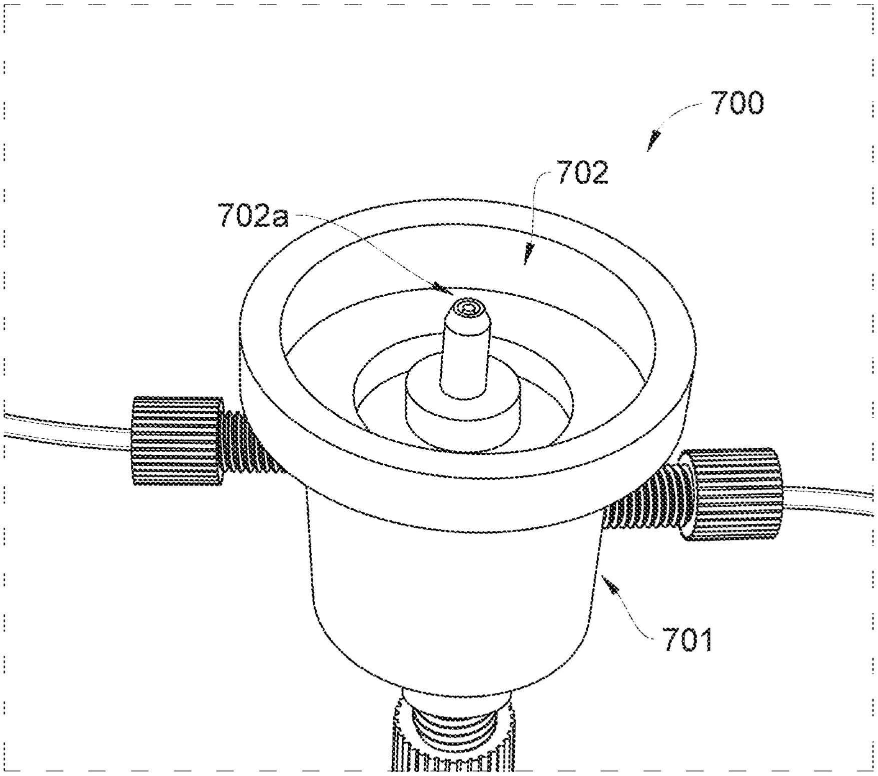
FIG. 7A is an image of a prototype sample delivery device according to the present teachings.
Figure 7B:
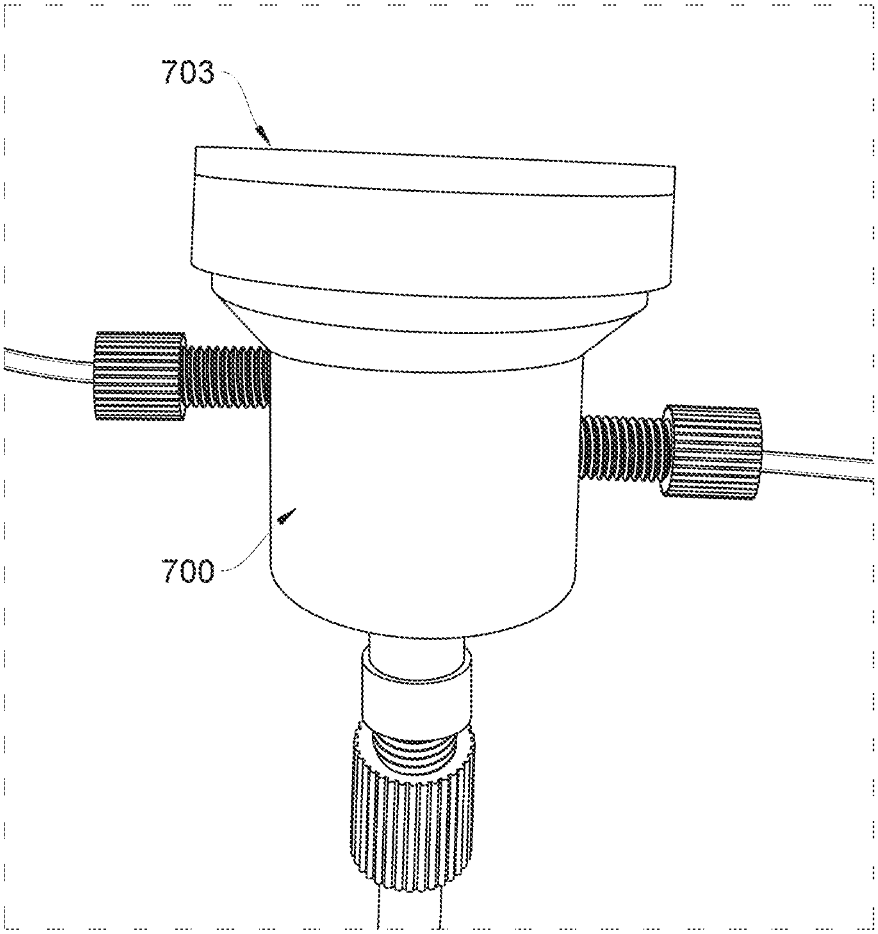
FIG. 7B is an image of a prototype sample delivery system according to the present teachings.

FIG. 7A depicts a prototype sample delivery device 700 according to an embodiment, which includes a shell 701 providing a chamber in which an OPP 702 is disposed. The OPP 702 includes an open end 702*a* providing a liquid-air interface for receiving a sample. FIG. 7B depicts the device 700 coupled to an adapter 703, in the form of a cap, which is releasably coupled to the OPP 702 so as to allow aligning a sample holder, e.g., a capillary tube, to the OPP 702 for delivery of a sample thereto.

Example 2

Figure 8:
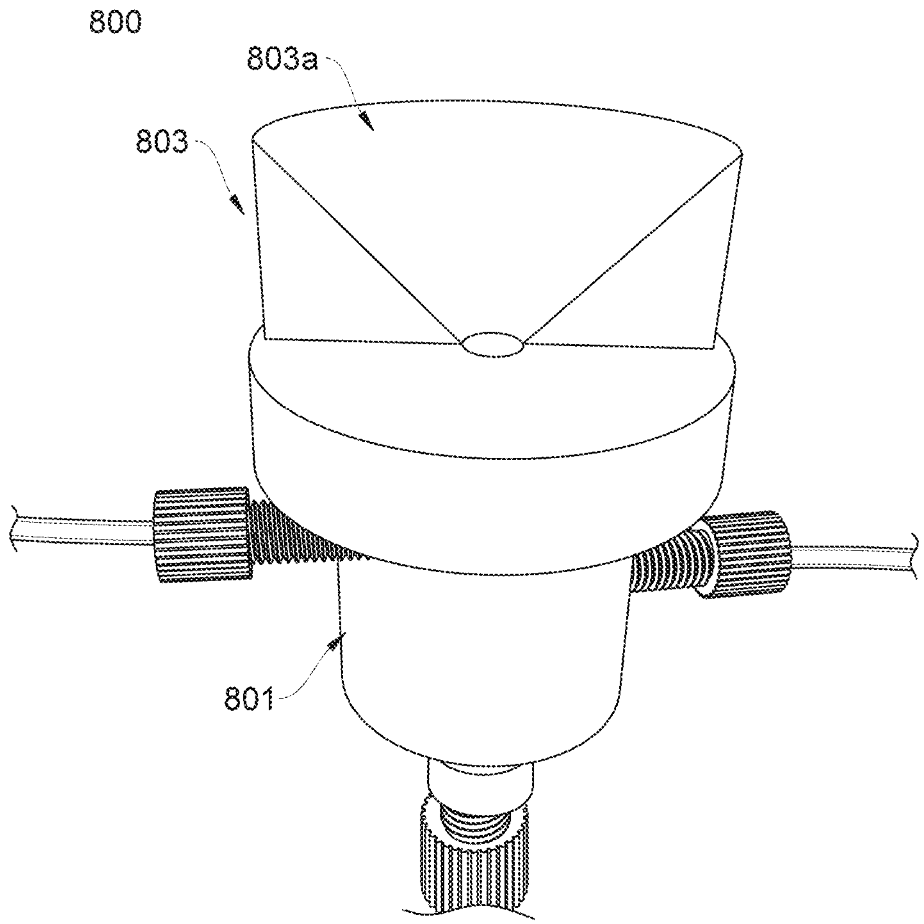
FIG. 8 is an image of another prototype sample delivery system according to the present teachings.

FIG. 8 shows a prototype sample delivery system 800 according to an embodiment, which includes a sample delivery device 801, such as the above device 700, coupled to an adapter 803. In this embodiment, the adapter 803 includes an alignment element 803*a* that is configured to guide the tip of a pipette to the open end of the OPP of the sample delivery device 801.

Example 3

Figure 9:
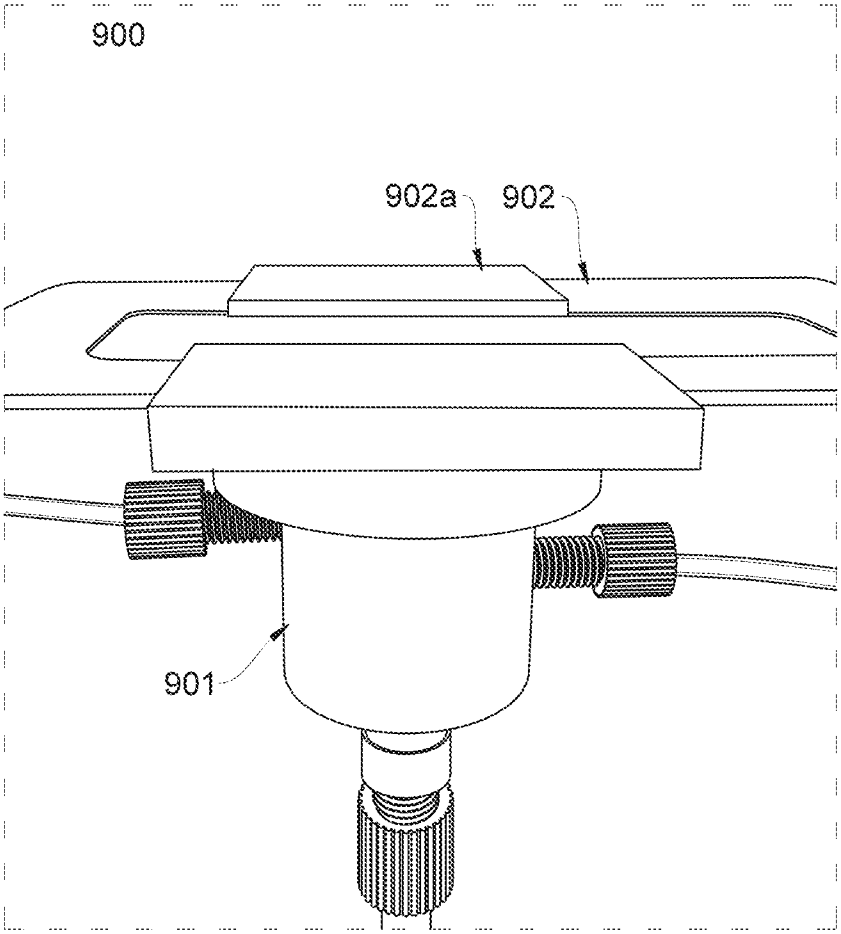
FIG. 9 is an image of another prototype sample delivery system according to the present teachings having an adapter for coupling to a DBS card.

FIG. 9 shows another prototype sample delivery system 900, which includes a sample delivery device 901, such as the above device 700, coupled to an adapter 902. In this embodiment, the adapter 902 includes an alignment element 902*a*, in the form of bracket, for aligning a DBS card with the OPP of the sample delivery device 901.

Those having an ordinary skill in the art will appreciate that various changes can be made to the above embodiments without departing from the scope of the invention. Further, various features of one embodiment can be used with another embodiment.

What is claimed:

1. A system for delivering a sample to a mass spectrometer, the system comprising:

a chamber extending from a top end to a bottom end;

a sampling probe with an open end disposed in the chamber and defining a sampling space to receive one or more sample analytes from a sample holder;

a solvent inlet port coupled to the chamber to receive a solvent and direct the solvent to the sampling space of the sampling probe; and an adapter configured to releasably and replaceably couple to the chamber to align the sample holder with the open end of the probe, wherein the adapter receives the sample holder and delivers sample analytes from the sample holder to the open end of the sampling probe through an adapter channel defined in the adapter;

wherein the top end of the chamber comprises an external mounting surface to which the adapter releasably and replaceably couples, and wherein the adapter comprises a top surface and a side wall extending downwardly from the top surface, with the side wall including an inner surface configured to engage the external mounting surface of the top end of the chamber upon coupling of the adapter to the chamber.

2. The system of claim 1, wherein the sampling probe further includes a probe outlet port configured to be in fluid communication with an ionization source to deliver the one or more sample analytes thereto.

3. The system of claim 1, further comprising:

a solvent overflow outlet coupled to an interior of the chamber and protruding from an exterior wall of the chamber, the solvent overflow outlet defining an internal conduit to receive and remove solvent overflow from the sampling probe.

4. The system of claim 1, wherein the sampling probe comprises a top portion including the open end of the sampling probe, the top portion configured, upon coupling the adapter to the chamber, to be received through a first end of the adapter channel defined in the adapter and to be in proximity of, or in contact with, an outlet port of the sample holder received by the adapter.

5. The system of claim 4, wherein the adapter includes an alignment element to position the sample holder at, or proximate to, a second opening of the adapter channel so as to align the outlet port of the sample holder with the open end of the sampling probe for introduction of the one or more sample analytes contained in the sample holder to the sampling probe.

6. The system of claim 5, wherein the alignment element comprises a slot formed on a top surface of the adapter.

7. The system of claim 5, wherein the alignment element comprises an inverted, truncated conical surface protruding above a top surface of the adapter and tapering down to the second opening of the adapter channel.

8. The system of claim 1, further comprising the sample holder, wherein the sample holder comprises any of a pipette, a capillary tube, a melting point tube, a dried blood spot (DBS) card, and a vial cap.

9. A device for introducing a sample to a mass spectrometer, comprising:

a chamber extending from a top end to a bottom end, the top end of the chamber configured to be releasably and replaceably coupled to an adapter receiving a sample holder;

a sampling probe with an open end disposed in the chamber and defining a sampling space to receive one or more sample analytes through an adapter channel defined in the adapter, wherein the sampling probe includes an outlet port configured to be in fluid communication with an ionization source to deliver the one or more sample analytes thereto; and a solvent inlet port coupled to the chamber to receive a solvent and direct the solvent to the sampling space of the sampling probe;

wherein the top end of the chamber comprises an external mounting surface to which the adapter releasably and replaceably couples, and wherein the adapter comprises a top surface and a side wall extending downwardly from the top surface, with the side wall including an inner surface configured to engage the external mounting surface of the top end of the chamber upon coupling of the adapter to the chamber.

10. The device of claim 9, further comprising a solvent overflow outlet coupled to an interior of the chamber and protruding from an exterior wall of the chamber, the solvent overflow outlet defining an internal conduit to receive and remove solvent overflow from the sampling probe.

11. The device of claim 9, wherein the top end of the chamber comprises a mounting surface to which the adapter releasably and replaceably couples.

12. The device of claim 9, wherein the sampling probe comprises a top portion including the open end, the top portion configured, upon coupling the adapter to the chamber, to be received through a first end of the adapter channel defined in the adapter and to be in proximity of, or in contact with, an outlet port of the sample holder received by the adapter.

13. The device of claim 9, wherein the chamber comprises a bottom cylindrical portion and an upper cylindrical portion, each of the portions including a side wall, and wherein the top cylindrical portion has a larger diameter than the lower cylindrical portion.

14. The device of claim 13, wherein an external surface of the side wall of the top cylindrical portion defines the mounting surface for engaging with a respective mounting surface of the adapter.

15. The device of claim 13, further comprising a partition separating the upper cylindrical portion from the lower cylindrical portion, wherein the partition comprises an opening through which the sampling probe extends such that the open end of the sampling probe is positioned in the upper cylindrical portion.

16. The device of claim 15, further comprising a disk having an opening and supported by the partition such that the opening of the disk is in alignment with the partition opening, the disk having an opening through which the open port probe extends to maintain the open port probe in a desired orientation.

17. The device of claim 9, further comprising a fixation element for securing the sampling port probe to the chamber.

18. A kit for use with a mass spectrometer comprising:

an interfacing device for introducing a sample to a mass spectrometer, the interfacing device comprising:

a chamber extending from a top end to a bottom end;

a sampling probe with an open end disposed in the chamber and defining a sampling space to receive one or more sample analytes; and a solvent inlet port coupled to the chamber to receive a solvent and direct the solvent to the sampling space of the sampling probe;

two or more adapters, each configured to releasably and replaceably couple to the chamber to align a sample holder with the open end of the probe, wherein the adapter receives the sample holder and delivers sample analytes from the sample holder to the open end of the sampling probe through an adapter channel defined in the adapter; and two or more different sample holders;

wherein the chamber is configured to releasably and replaceably couple at its top end to each of the two or more adapters separately, each of the two or more adapters being configured to align a respective one of the two or more different sample holders with the sampling space of the sampling probe when the sampling probe is coupled to the adapter;

wherein the top end of the chamber comprises an external mounting surface to which each of the two or more adapters releasably and replaceably couples, and wherein each of the two or more adapters comprises a top surface and a side wall extending downwardly from the top surface, with the side wall including an inner surface configured to engage the external mounting surface of the top end of the chamber upon coupling of the each of the two or more adapters to the chamber.

19. The kit of claim 18, wherein each of the two or more different sample holders comprises any of a pipette, a capillary tube, a melting point tube, a dried blood spot (DBS) card, and a vial cap.

* * * * *